(12) United States Patent
Soeder et al.

(10) Patent No.: US 9,378,012 B2
(45) Date of Patent: Jun. 28, 2016

(54) GENERATION OF API CALL GRAPHS FROM STATIC DISASSEMBLY

(71) Applicant: Cylance Inc., Irvine, CA (US)

(72) Inventors: Derek A. Soeder, Irvine, CA (US); Matt Wolff, Newport Beach, CA (US)

(73) Assignee: Cylance Inc., Irvine, CA (US)

( * ) Notice: Subject to any disclaimer, the term of this patent is extended or adjusted under 35 U.S.C. 154(b) by 0 days.

(21) Appl. No.: 14/590,788

(22) Filed: Jan. 6, 2015

(65) Prior Publication Data

US 2015/0220333 A1 Aug. 6, 2015

Related U.S. Application Data

(63) Continuation of application No. 14/169,841, filed on Jan. 31, 2014, now Pat. No. 8,930,916.

(51) Int. Cl.
*G06F 9/44* (2006.01)
*G06F 9/45* (2006.01)
*G06F 11/34* (2006.01)

(52) U.S. Cl.
CPC .. *G06F 8/75* (2013.01); *G06F 8/53* (2013.01); *G06F 11/34* (2013.01)

(58) Field of Classification Search
CPC ............. G06F 17/30286; G06F 17/30321; G06F 17/30345; G06F 17/30424; G06F 17/30483; G06F 8/75; G06F 8/458; G06F 11/3604; G06F 11/3688
See application file for complete search history.

(56) References Cited

U.S. PATENT DOCUMENTS

| | | | |
|---|---|---|---|
| 6,430,590 B1 | 8/2002 | Fischer | |
| 6,546,551 B1 | 4/2003 | Sweeney et al. | |
| 7,240,048 B2 | 7/2007 | Pontius | |
| 7,937,705 B1 | 5/2011 | Prael et al. | |
| 7,945,902 B1 | 5/2011 | Sahoo | |
| 8,135,994 B2 | 3/2012 | Keromytis et al. | |
| 8,347,272 B2 * | 1/2013 | Sugawara | G06F 8/458 712/203 |
| 8,370,613 B1 | 2/2013 | Manadhata et al. | |
| 8,549,647 B1 | 10/2013 | Mason et al. | |
| 8,631,395 B2 | 1/2014 | Sathyanathan et al. | |
| 8,930,916 B1 | 1/2015 | Soeder et al. | |
| 9,015,685 B2 * | 4/2015 | Greiner | G06F 11/3688 703/14 |

(Continued)

FOREIGN PATENT DOCUMENTS

EP 1762957 A1 3/2007

OTHER PUBLICATIONS

Nguyen et al., A graph-based approach to API usage adaptation, Oct. 2010, 20 pages.*

(Continued)

*Primary Examiner* — Thuy Dao
(74) *Attorney, Agent, or Firm* — Mintz Levin Cohn Ferris Glovsky and Popeo, P.C.

(57) ABSTRACT

Data is received that includes at least a portion of a program. Thereafter, entry point locations and execution-relevant metadata of the program are identified and retrieved. Regions of code within the program are then identified using static disassembly and based on the identified entry point locations and metadata. In addition, entry points are determined for each of a plurality of functions. Thereafter, a set of possible call sequences are generated for each function based on the identified regions of code and the determined entry points for each of the plurality of functions. Related apparatus, systems, techniques and articles are also described.

15 Claims, 4 Drawing Sheets

(56) References Cited

U.S. PATENT DOCUMENTS

| | | | |
|---|---|---|---|
| 9,104,525 B2* | 8/2015 | Dang | G06F 8/75 |
| 9,176,842 B2* | 11/2015 | Chen | G06F 11/3466 |
| 2005/0049497 A1 | 3/2005 | Krishnan et al. | |
| 2006/0112388 A1 | 5/2006 | Taniguchi et al. | |
| 2006/0282476 A1* | 12/2006 | Dolby | G06F 8/458 |
| 2008/0133571 A1 | 6/2008 | O'Sullivan et al. | |
| 2008/0288965 A1* | 11/2008 | Grechanik | G06F 8/36 719/328 |
| 2009/0132449 A1 | 5/2009 | Nagashima | |
| 2009/0133125 A1 | 5/2009 | Choi et al. | |
| 2010/0082513 A1 | 4/2010 | Liu | |
| 2010/0107170 A1 | 4/2010 | Stehley | |
| 2010/0318999 A1 | 12/2010 | Zhao et al. | |
| 2010/0325620 A1 | 12/2010 | Rohde et al. | |
| 2011/0004574 A1 | 1/2011 | Jeong et al. | |
| 2011/0138369 A1 | 6/2011 | Chandra et al. | |
| 2012/0079490 A1 | 3/2012 | Bond et al. | |
| 2012/0221497 A1 | 8/2012 | Goyal et al. | |
| 2013/0103380 A1 | 4/2013 | Brandstätter et al. | |
| 2013/0205279 A1 | 8/2013 | Osminer et al. | |
| 2013/0227683 A1 | 8/2013 | Bettini et al. | |
| 2013/0263097 A1 | 10/2013 | Dawson et al. | |
| 2013/0291111 A1 | 10/2013 | Zhou et al. | |
| 2014/0180738 A1 | 6/2014 | Phillipps et al. | |
| 2014/0250429 A1 | 9/2014 | Greiner et al. | |
| 2014/0379619 A1 | 12/2014 | Permeh et al. | |

OTHER PUBLICATIONS

Bai et al., Detecting Malicious Behavior Using Critical API-Calling Graph Matching, 2009, 4 pages.*
Bird, Steven et al. "Annotation Tools Based on the Annotation Graph API." Jul. 2001. 4 pages.
Dahl et al. "Large-Scale Malware Classification Using Random Projections and Neural Networks." *2013 IEEE International Conference on Acoustics, Speech and Signal Processing (ICASSP)*. May 26-31, 2013. Vancouver, BC. pp. 3422-3426.
Eagle. "Chapter 1: Introduction to Disassembly." *The Ida Pro Book: The Unofficial Guide to the World's Most Popular Disassembler*. San Francisco: No Starch Press. 2nd Edition (2011):3-14.
Iczelion. "Tutorial 1: Overview of PE File format." *Programming Horizon*. Jun. 1, 2013. Wayback Machine. Web. Feb. 23, 2015.
Nguyen, Hoan Anh et al. "A Graph-based Approach to API Usage Adaptation." *OOPSLA/SPLASH '10*. Oct. 17-21, 2010. Reno/Tahoe, Nevada, USA. Oct. 2010:(302321).
Rieck et al. "Automatic analysis of malware behavior using machine learning." *Journal of Computer Security*. 19(2011):639-668.
Shin, DaeMin et al. "Data Hiding in Windows Executable Files." *Proceedings of the 6th Australian Digital Forensics Conference*. Edith Cowan University. Perth Western Australia. Dec. 3, 2008. Research Online.
Inoue, Hajime "Anomaly Detection in Dynamic Execution Environments." Abstract of Dissertation. Jan. 31, 2005. XP055191583. ISBN: 978-0-54-249408-6. 190 pages. Retrieved from the Internet: URL:https://www.cs.unm.edu/~forrest/dissertations/inouedissertation.pdf [retrieved on May 26, 2015].
Stolfo, Salvatore J. et al. "Anomaly Detection in Computer Security and an Application to File System Accesses". In: "Lecture Notes in Computer Science". Jan. 31, 2005. M.S Hacid et al. (EDS):ISMIS 2005, LNAI. Springer. Berlin, Heidelberg. XP055192090. vol. 3488:14-28.
Wang, Xun et al. "Detecting Worms via Mining Dynamic Program Execution." Third International Conference on Security and Privacy in Communications Networks and the Workshops, 2007. SECURECOMM 2007. IEEE. Piscataway, NJ. USA. Sep. 17, 2007 pp. 412-421. xp031276575. Isbn: 978-1-4244-0974-7.
De Campos, Luis M. et al. "Bayesian Networks Classifiers for Gene-Expression Data". *Intelligent Systems Design and Applications (ISDA)*. 2011 11th International Conference on, IEEE, Nov. 22, 2011, pp. 1200-1206, XP032086221, DOI: 10.1109/ISDA.2011.6121822 ISBN: 978-1-4577-1676-8.
Samak, Taghrid et al. "Online Fault and Anomaly Detection for Large-Scale Scientific Workflows". *High Performance Computing and Communications (HPCC)*, 2011 IEEE 13th International Conference on, IEEE, Sep. 2, 2011, pp. 373-381, XP032068211, DOI: 10.1109/HPCC.2011.55 Isbn: 978-1-4577-1564-8.
Shabtai, A et al. "Detection of malicious code by applying machine learning classifiers on static features: A state-of-the-art survey". *Information Security Technical Report, Elsevier Advanced Technology*. Amsterdam, NL, vol. 14, No. 1, Feb. 1, 2009, pp. 16-29, XP026144093, ISSN: 1363-4127.
Xu, J-Y. et al. "Polymorphic Malicious Executable Scanner by API Sequence Analysis." Proceedings of the Fourth International Conference on Hybrid Intelligent Systems. (HIS 2004).Kitakyushu, Japan. Dec. 5-8, 2004. Piscataway, NJ, USA, IEEE, Dec. 5, 2004, pp. 378-383, XP010778797.
Data Type. *Wikipedia: The Free Encyclopedia*. Wikimedia Foundation, Inc. Jul. 20, 2015. Web. Jul. 20, 2015. URL: https://en.wikipedia.org/wiki/Data_type.
"File System". *Wikipedia: The Free Encyclopedia*. Wikimedia Foundation, Inc. Jul. 11, 2015. Web. Jul. 20, 2015. URL: https://en.wikipedia.org/wiki/File_system.

* cited by examiner

GENERATION OF API CALL GRAPHS FROM STATIC DISASSEMBLY

CROSS REFERENCE OF RELATED APPLICATION

This application is a continuation of and claims the benefit of priority under 35 U.S.C. §120 of U.S. patent application Ser. No. 14/169,841 filed Jan. 31, 2014 issuing under U.S. Pat. No. 8,930,916 on Jan. 6, 2015, entitled "Generation of API Call Graphs From Static Disassembly" the disclosure of which is incorporated herein by reference.

TECHNICAL FIELD

The subject matter described herein relates to generation of application programming interface (API) call graphs from static disassembly of program code.

BACKGROUND

In modern execution environments, a program generally only has control of its own private virtual memory and the unprivileged state of the central processing unit (CPU) executing the program. To alter the state of the system at large, the program must request that the operating system (OS) perform some operation on its behalf, almost always by calling a well-defined API function provided by the OS. Capturing the API calls performed by a program, and additionally the parameters supplied in each call and the result of each call, is a simple, concise, and effective means of profiling the behavior of a program.

Most API call profiling systems execute a program of interest in a virtual machine featuring a complete OS installation and some amount of user- or kernel-mode instrumentation for intercepting and recording API calls. However, such a dynamic analysis approach consumes a significant amount of resources required for each virtual machine, thereby dramatically limiting the number of virtual machines that can concurrently run on a physical computer. In addition, programs are typically executed in real-time and so they might wait for some event to occur or time interval to elapse before exhibiting any significant activity—meaning the system might be forced to run each program of interest for minutes or risk aborting before the program has performed substantive API calls.

Lighter-weight implementations that emulate programs of interest have been adopted. However, emulators often suffer from incomplete implementations of the API and detectable divergences from the behavior of a real execution environment, but they generally offer size and speed benefits. Both emulators and virtual machines face the significant drawback that they can only profile a single path of execution—generally they do not consider the other paths which execution potentially could have followed through the code.

SUMMARY

In a first aspect, data is received that includes at least a portion of a program. Thereafter, entry point locations and execution-relevant metadata of the program are identified and retrieved. Regions of code within the program are then identified using static disassembly and based on the identified entry point locations and metadata. In addition, entry points are determined for each of a plurality of functions. Thereafter, a set of possible call sequences are generated for each function based on the identified regions of code and the determined entry points for each of the plurality of functions.

The call sequences can include application programming interface API calls. The call sequences can also include calling subfunctions implemented by the program. An API call graph can be generated that characterizes the generated set of possible call sequences.

At least one of the calls in the call sequence can be decorated with parameter information affecting a behavior of the corresponding function.

The entry point locations can correspond to places within the program at which an operating system or other program initiates execution of the program.

The identifying and retrieving entry point locations can include, as one example, scanning the program for pre-defined byte sequences.

The disassembly can include, for example, emulation-augmented disassembly.

In an interrelated aspect, data is received that includes at least a portion of a program comprising machine code. Thereafter, the machine code is disassembled into instructions. These instructions are then organized into functions comprising code blocks. A control flow graph is then constructed that characterizes the functions. Application programming interface (API) call sequences are next extracted by traversing some or all possible paths through the control flow graph. Subsequently, a relative order of API calls and child function calls is determined so that an API call graph can be generated that is based on the extracted API call sequences according to the determined relative order.

Non-transitory computer program products (i.e., physically embodied computer program products) are also described that store instructions, which when executed on one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, the current subject matter provides an approach to extracting API call sequences from a program that achieves far greater code coverage than conventional techniques, in many cases producing much more representative API call sequences. In particular, the current subject matter uses static disassembly (aided by program metadata when available) to construct control flow graphs of the possible paths that execution can take, at both the basic block and function levels. The end result of this process is a compressed representation of every possible sequence of API calls that could occur starting from a point where execution enters the program, with parameter values captured as desired and to the extent possible.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
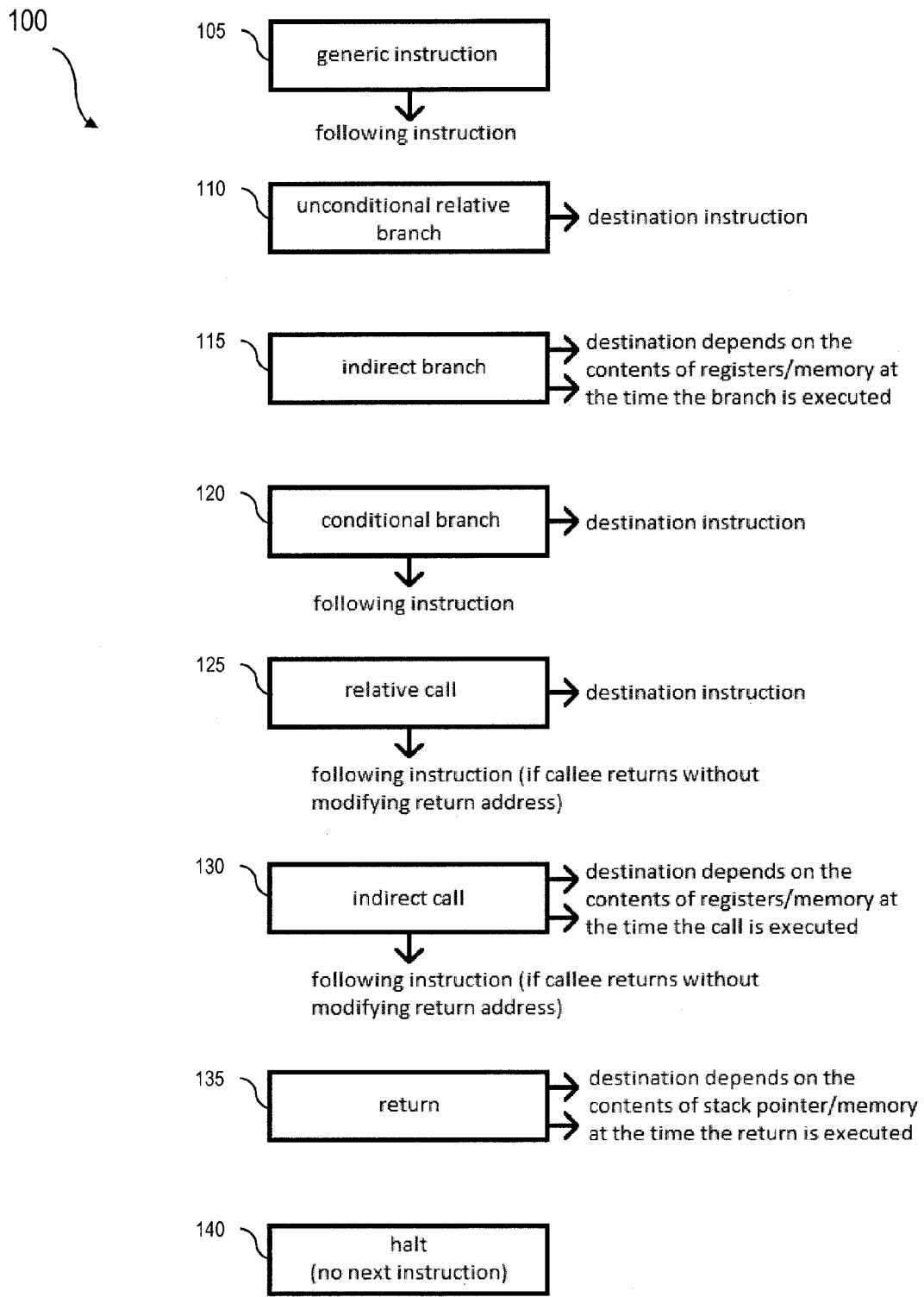
FIG. 1 is a process flow diagram illustrating handling of various classes of instructions.

Initially, code (e.g., all code) within a given program can be discovered through static disassembly. Static disassembly in this regard refers to a process of iteratively traversing the instructions constituting a program's code by alternately decoding an instruction and predicting the effect or possible effects that the instruction would have on the flow of execution if it were executed. A program has one or more well-defined entry points where the OS or another program may initiate execution; therefore, it is generally expected that code will exist at these entry points. In some cases, code discovery can be improved by scanning the program for certain byte sequences typically indicative of code, such as a common prolog or a well-known function. In situations in which a portion of code is only reached via an execution transfer determined from complicated runtime state, scanning for common code byte sequences offers a simple and fairly effective alternative to static disassembly for discovering that code. As an example, consider a virtual function or callback that is supplied by the program to the OS for later execution. Even if static disassembly encounters a pointer to the function, it might not recognize that the pointer will be used by the OS as a function pointer, and therefore it might not disassemble the referenced function. However, if the function begins with a common prolog such as "PUSH EBP/MOV EBP, ESP/SUB ESP, imm", scanning the program for that prolog sequence will result in the discovery and subsequent disassembly of that function and likely other functions as well. In many cases, programs also contain metadata that describe where code or execution-relevant data reside in the program. Examples include the runtime function information in 64-bit native WINDOWS programs, relocations, exception handler structures, and MICROSOFT Interface Definition Language (MIDL) structures.

Because programs often contain data and padding interspersed with chunks of code, disassembly commences at the entry point(s) and other well-defined locations known to contain code, and it discovers subsequent code one instruction at a time. For instance, a Portable Executable header may specify a program entry point to be executed by the OS after the program has loaded, an export directory describing functions or program elements which the program intends to make available to other programs, a Thread Local Storage directory describing callback functions to be executed by the OS, a delay import directory referencing delay import helper functions, exception data referencing exception handling functions, and so on. Other structures referencing code might also exist, such as Remote Procedure Call (RPC)-related structures referencing RPC server-side functions to be executed by the RPC runtime. For the most part, each instruction implicitly flows into the instruction immediately following it, although branch, call, and return instructions which explicitly redirect execution also exist.

FIG. 1 is a diagram 100 that lists various classes of instructions according to how they can affect execution and therefore how disassembly should proceed upon encountering them. In particular, FIG. 1 shows representations of classes of x86-family instructions according to their effect on the flow of execution. The primary distinction is whether the instruction will never, sometimes, or always redirect execution—that is, whether it makes sense to continue disassembling immediately after the instruction, or if disassembly should continue at a different location, or both.

With reference again to diagram 100 of FIG. 1, a generic instruction 105 (as used in disassembly) can be defined as an instruction that implicitly passes execution to the instruction immediately following it (i.e., the program counter is incremented by the length of the instruction). The possibility of an execution transfer due to an exception (such as a processor trap or fault) or other interrupt is not depicted in FIG. 1. An unconditional relative branch instruction 110, on the other hand, explicitly can transfer execution to a destination which is relative to the relative branch instruction, and therefore does not implicitly pass execution to a following instruction. An indirect branch instruction 115 can also explicitly transfer execution, but the destination is retrieved from the system's state rather than explicitly encoded in the branch instruction, which generally makes the destination nontrivial to determine during disassembly. A conditional relative branch instruction 120 can transfer execution explicitly to a destination relative to itself, or it may implicitly pass execution to the following instruction. The state of the CPU flags register can control which of the two possibilities is realized, and therefore it can be nontrivial or even impossible to determine during static disassembly unless the relative conditional branch instruction's destination is equal to the following instruction. A relative call instruction 125, like a relative branch instruction, can explicitly transfer execution to a destination relative to itself, but it can also push the address immediately following itself (that is, the address of the instruction plus the length of the instruction) onto the stack. It can generally be assumed for the sake of disassembly that the call instruction's destination is the entry point of a function which will return to the address following the call, but this is not strictly guaranteed. For example, a "no return" function will not return execution, and therefore the compiler might place data or unrelated code immediately after a call to such a function.

An indirect call instruction 130 can explicitly transfer execution in the same manner as an indirect branch instruction while pushing the address immediately following itself in the same manner as a relative call instruction, and it is therefore subject to the caveats of both. For the current purposes, a software interrupt instruction (not shown) is conceptually equivalent to an indirect call instruction. A return instruction 135 can transfer execution to an address popped from the top of the stack; this is generally the address of an instruction immediately following a call instruction, but like the destination of an indirect branch instruction, this address is dependent on the state of the system and may be nontrivial to determine during disassembly. Finally, a halt instruction 140 does not transfer execution at all: it remains at the halt instruction until an interrupt occurs.

With this basic knowledge for each type of instruction, static disassembly can generally produce a control flow graph covering the extent of program code reachable from a program entry point or any other identifiable instruction, excluding those transitions in execution flow that depend on run-time state and therefore cannot be easily predicted during static disassembly. A control flow graph in this regard refers to a directed graph in which each instruction is a node and each possible execution transfer is an edge. For efficiency, each node may instead represent a block of one or more instructions through which there is only a single path of execution. As suggested above, however, static disassembly may not always succeed in constructing a complete control flow graph, as there may be transitions in execution that it fails to fully traverse. One difficult example of such a transition is a traversal of indirect branches, indirect calls, and returns. Special-case logic can handle some such situations: The possible destinations of branches and calls making use of indexed, static tables (e.g., "JMP [table+EAX*4]") can often be elicited by checking for nearby instructions that confine the index and by examining table memory for valid pointers (especially those marked with relocations).

Calls present a more subtle challenge. Although it seems intuitive to continue disassembly after a call instruction, not every callee will return execution to the return address supplied to it. Here, "no return" functions and calls that are meant to push the instruction pointer for subsequent retrieval can sometimes be identified, which allows for avoiding disassembling likely non-code after a relative call instruction in the simplest cases.

To better handle situations in which execution is influenced by information outside the scope of a single instruction, a disassembler can be augmented with an emulation-like understanding of instructions and API calls. In order to avoid the drawbacks of emulation, this capability can be mostly used to propagate information to where there would otherwise be none. For example, disassembly without emulation would not know the target of a "CALL EBX" instruction, but with emulation it might be able to track that the EBX register was previously loaded with a specific function pointer. In general, emulation should not be used to restrict which paths of execution are explored, although it can be helpful in avoiding the disassembly of non-code.

With the current emulation, considered are both a ternary representation of integers (in which the state of each bit is maintained as a 0, 1, or X if indeterminate) with special symbolic consideration for pointers (see "Advanced Return Address Discovery Using Context-Aware Machine Code Emulation", Soeder et al., July 2004, the contents of which are hereby fully incorporated by reference), and fully symbolic emulation in which values are maintained as arithmetic expressions capable of simplification by a Satisfiability Modulo Theory (SMT) solver. Such a form of emulation provides more comprehensive code coverage, better tracking of API function calls, and better tracking of the parameters supplied to API calls, all three of which are facilitated by the more powerful propagation of information (especially function pointers).

Figure 2:
FIG. 2 is a diagram illustrating an example of higher-level language source code.

For illustration purposes, an example function is rendered in four forms: its original, higher-level language source code (diagram 200 of FIG. 2); a disassembly of the compiled function into x86 instructions (listed below); a control flow graph representing the compiled code's constituent blocks (diagram 300 of FIG. 3); and the API call sequences that the function has the potential to perform (listed below). In particular, diagram 200 of FIG. 2 illustrates a function written in C++ which makes use of the following WINDOWS API calls: CreateFileW, CloseHandle, GetFileSize, DeleteFileW, LocalAlloc, LocalFree, and ReadFile.

Below is an assembly-language listing of the function of diagram 200 of FIG. 2 when it is compiled to x86 instructions. The disassembly can be divided into basic code blocks after branch instructions, and at branch destinations; with each instruction being annotated with a letter in brackets representing the code block to which it belongs.

```
func:
[A]      push     ebp
[A]      mov      ebp, esp
[A]      sub      esp, 8
[A]      push     ebx
[A]      push     esi
[A]      mov      esi, ecx
[A]      push     0
[A]      push     0
[A]      push     3
[A]      push     0
[A]      push     1
[A]      push     0x80000000
[A]      push     esi
[A]      call     dword ptr [CreateFileW]
[A]      mov      ebx, eax
[A]      cmp      ebx, -1
[A]      jne      loc_1
[B]      pop      esi
[B]      xor      eax, eax
[B]      pop      ebx
[B]      mov      esp, ebp
[B]      pop      ebp
[B]      ret      4
loc_1:
[C]      push     edi
[C]      push     0
[C]      push     ebx
[C]      call     dword ptr [GetFileSize]
[C]      mov      edi, eax
[C]      cmp      edi, -1
[C]      jne      loc_2
[D]      push     ebx
[D]      call     dword ptr [CloseHandle]
[D]      pop      edi
[D]      pop      esi
[D]      xor      eax, eax
[D]      pop      ebx
[D]      mov      esp, ebp
[D]      pop      ebp
[D]      ret      4
loc_2:
[E]      test     edi, edi
[E]      jnz      loc_3
[F]      push     ebx
[F]      call     dword ptr [CloseHandle]
[F]      push     esi
[F]      call     dword ptr [DeleteFileW]
[F]      pop      edi
[F]      pop      esi
[F]      xor      eax, eax
[F]      pop      ebx
[F]      mov      esp, ebp
[F]      pop      ebp
[F]      ret      4
loc_3:
[G]      push     edi
[G]      push     0
[G]      call     dword ptr [LocalAlloc]
[G]      mov      ecx, eax
[G]      mov      [ebp-8], ecx
[G]      test     ecx, ecx
[G]      jz       loc_6
[H]      xor      esi, esi
[H]      test     edi, edi
[H]      jz       loc_6
loc_4:
[I]      push     0
[I]      lea      eax, [ebp-4]
[I]      push     eax
[I]      mov      eax, edi
[I]      sub      eax, esi
[I]      push     eax
[I]      lea      eax, [esi+ecx]
[I]      push     eax
```

```
[I]      push     ebx
[I]      mov      dword ptr [ebp-4], 0
[I]      call     dword ptr [ReadFile]
[I]      test     eax, eax
[I]      jz       loc_5
[J]      mov      eax, [ebp-4]
[J]      test     eax, eax
[J]      jz       loc_5
[K]      mov      ecx, [ebp-8]
[K]      add      esi, eax
[K]      cmp      esi, edi
[K]      jb       loc_4
[L]      mov      esi, ecx
[L]      jmp      loc_7
loc_5:
[M]      mov      esi, [ebp-8]
[M]      push     esi
[M]      call     dword ptr [LocalFree]
[M]      xor      esi, esi
[M]      jmp      loc_7
loc_6:
[N]      mov      esi, eax
loc_7:
[O]      push     ebx
[O]      call     dword ptr [CloseHandle]
[O]      pop      edi
[O]      mov      eax, esi
[O]      pop      esi
[O]      pop      ebx
[O]      mov      esp, ebp
[O]      pop      ebp
[O]      ret      4
```

Figure 3:
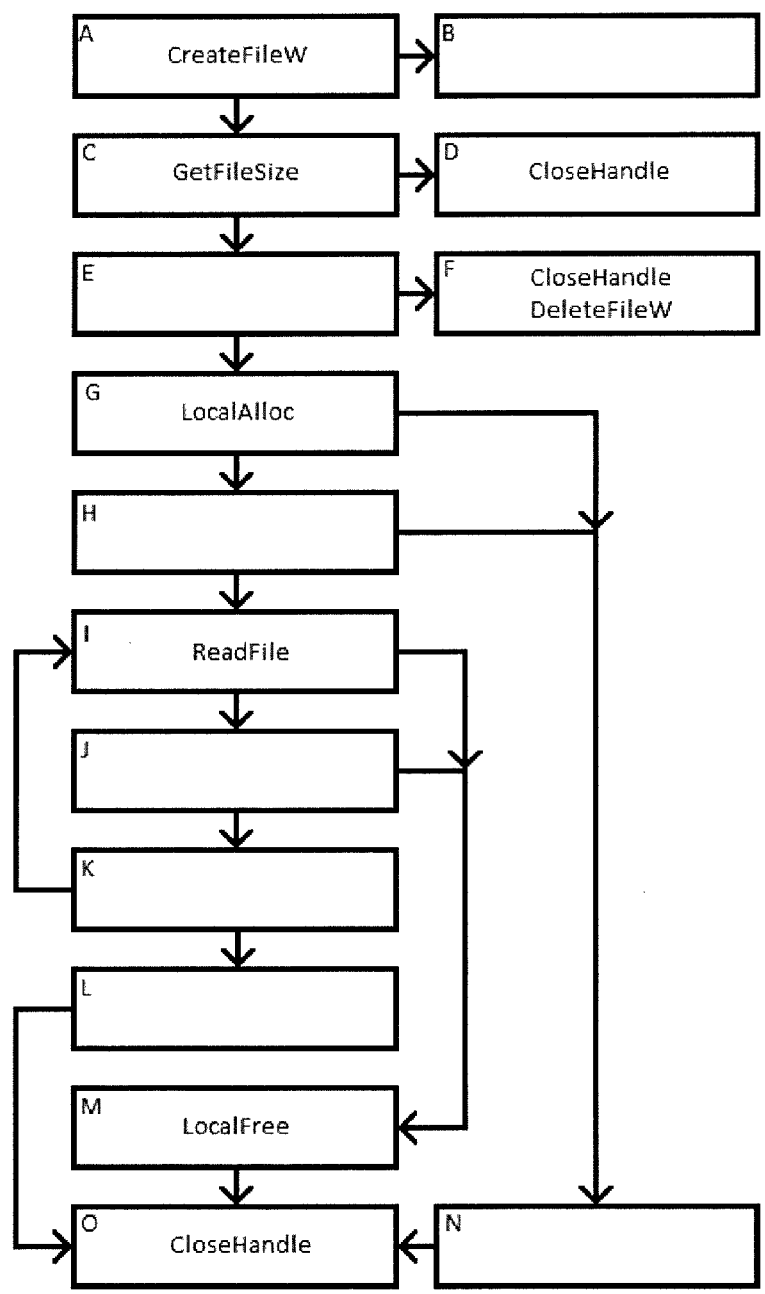
FIG. 3 is a diagram illustrating a control flow graph representing constituent blocks of compiled code corresponding to FIG. 2.

FIG. 3 is a directed graph 300 of the basic code blocks of the above disassembly. If a code block performs any API calls, the names of the called API functions appear within the corresponding rectangle. Note that the graph contains a cycle (loop) over blocks I, J, and K.

Below are all API call sequences possible in the example function of the diagram 200 of FIG. 2. The ReadFile API call is marked with an asterisk because it may occur repeatedly during execution of the loop.

```
CreateFileW
CreateFileW, GetFileSize, CloseHandle
CreateFileW, GetFileSize, CloseHandle, DeleteFileW
CreateFileW, GetFileSize, LocalAlloc, CloseHandle
CreateFileW, GetFileSize, LocalAlloc, ReadFile, CloseHandle
CreateFileW, GetFileSize, LocalAlloc, ReadFile*, CloseHandle
CreateFileW, GetFileSize, LocalAlloc, ReadFile, LocalFree,
CloseHandle
CreateFileW, GetFileSize, LocalAlloc, ReadFile*, LocalFree,
CloseHandle
```

Given a program containing machine code, the current approach disassembles the code into instructions, which it then organizes into functions comprising basic code blocks. At the intra-function level, construction of a control flow graph enables the extraction of API call sequences by exhaustively traversing all possible paths through the graph, noting which API calls occur in a loop but never visiting any block more than twice per path in order to avoid indefinite traversal. The approach can then generate a call graph—a directed graph in which nodes represent functions and edges represent one function calling another (or itself)—for the entire program.

Although the call graph depicts calls between functions, this information alone is not sufficient to allow accurate reconstruction of all inter-function API call sequences—the relative order of child function calls and API calls needs to be captured. For instance, if a function g calls API A, function f, and API B, and if function f calls API C, the call sequence "A f B" for function g and "C" for function f can be maintained, so that the former sequence can be properly expanded into "A C B". If non-API function calls are not included in the call sequence, one would be left with a call graph telling only that function g has the API call sequence "A B" and may call function f, which in turn has the API call sequence "C", making it unclear which sequences among "A B", "A B C", "A B C C", "A C B", "A C B C", "C A B", etc., are actually possible.

Although all function call sequences could be expanded into an exhaustive set of API call sequences, the number of sequences to be considered would likely become infeasibly large. Instead, this compressed representation of API call sequences can be maintained and algorithms can be considered to search for API call n-grams within or between the per-function API call sequences.

To produce even more descriptive API call sequences, the API calls can be decorated with parameter information when available. Returning to the earlier example, the API calls listed above can be decorated as follows:

```
CreateFileW(x, 0x80000000, 1, 0, 3, 0, 0)
GetFileSize(x, 0)
DeleteFileW(x)
LocalAlloc(0, x)
ReadFile(x, x, x, x, 0)
ReadFile(x, x, x, x, 0)*
LocalFree(x)
CloseHandle(x)
```

The parameter information retained should be specific only insofar as it affects the behavior of the API function or serves as a reasonably generic fingerprint. For instance, noting that an API function is called with a reference to a certain stack location is overly specific, as it is subject to change across platforms and even among recompilations of the same code. Meanwhile, other parameter values—such as the access mask passed to CreateFileW, or the function name passed to GetProcAddress—are valuable as differentiators among the possible intentions a program might have for calling a given API function.

Figure 4:
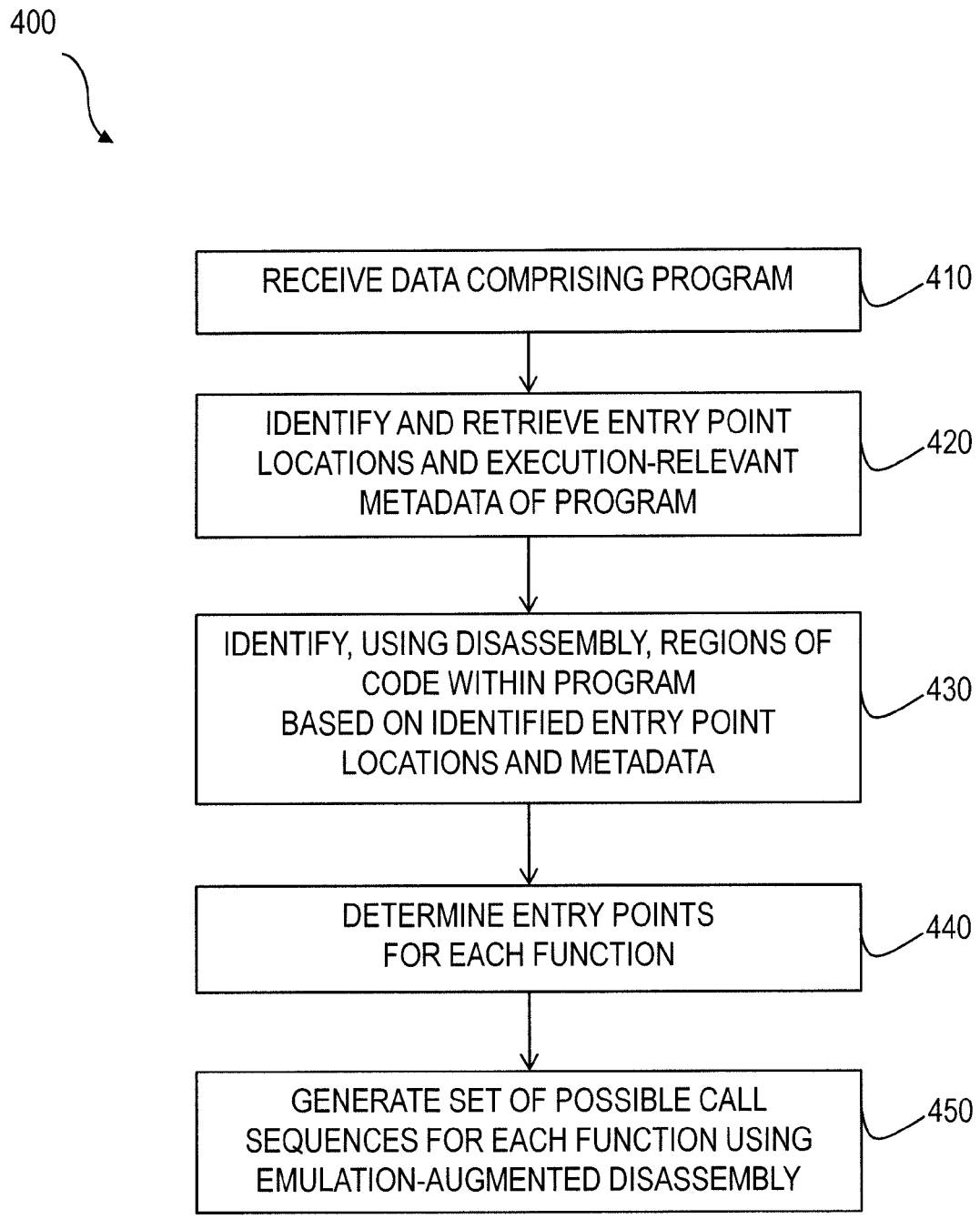
FIG. 4 is a process flow diagram illustrating generation of an API call graph.

FIG. 4 is a process flow diagram 400 illustrating generation of API call graphs. Initially, at 410, data is received that comprises at least a portion of a program. Thereafter, at 420, entry point locations and execution-relevant metadata of the program are identified and retrieved. Subsequently, at 430 using static disassembly, regions of code are identified within the program based on the identified entry point locations and the metadata. Next, at 440, entry points are determined for each of a plurality of functions so that, at 450, a set of possible call sequences are generated for each function based on the determined entry points for the plurality of functions.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A computer-implemented method comprising:
    receiving data comprising at least a portion of a program;
    first identifying and retrieving entry point locations and execution-relevant metadata of the at least a portion of the program;
    second identifying regions of code within the at least a portion of the program based on the identified entry point locations and the metadata;
    first generating, based on the first identifying and the second identifying, a set of possible call sequences for at least one function;
    second generating an API call graph characterizing the generated set of possible call sequences for the at least one function;
    disassembling the at least a portion of the program into instructions;
    organizing the instructions into at least one function that each comprise a code block;
    constructing a control flow graph characterizing the at least one function;
    extracting application programming interface (API) call sequences by traversing the control flow graph; and
    determining a relative order of API calls.

2. A method as in claim 1, wherein the call sequences further comprise application programming interface API calls.

3. A method as in claim 2, wherein the call sequences further comprise calling subfunctions implemented by the program.

4. A method as in claim 1, further comprising:
    decorating at least one of the calls in the call sequence with parameter information affecting a behavior of the corresponding function.

5. A method as in claim 1, wherein the entry point locations correspond to places within the at least a portion of the program at which an operating system or other program initiates execution of the at least a portion of the program.

6. A method as in claim 1, wherein the first identifying comprises:
    scanning the program for pre-defined byte sequences.

7. A method as in claim 1, wherein the second identifying uses disassembly.

8. A method as in claim 7, wherein the disassembly comprises emulation-augmented disassembly.

9. A method as in claim 1 further comprising:
    determining entry points for each of a plurality of functions.

10. A method as in claim 1 further comprising:
    determining a relative order of child function calls.

11. A method as in claim 1, wherein the API call graph is generated based on the extracted API call sequences according to the determined relative order of the API calls.

12. A method as in claim 11, wherein the API call graph is generated based on the extracted API call sequences according to the determined relative order of the API calls and the child function calls.

13. A method as in claim 1, wherein the receiving, first identifying, second identifying, first generating and second generating are implemented by at least one hardware data processor forming part of at least one computing system.

14. A non-transitory computer program product storing instructions which, when executed by at least one hardware data processor forming part of at least one computing system, result in operations comprising:
- receiving data comprising at least a portion of a program;
- first identifying and retrieving entry point locations and execution-relevant metadata of the at least a portion of the program;
- second identifying regions of code within the at least a portion of the program based on the identified entry point locations and the metadata;
- first generating, based on the first identifying and the second identifying, a set of possible call sequences for at least one function; and
- second generating an API call graph characterizing the generated set of possible call sequences for the at least one function;
- disassembling the at least a portion of the program into instructions,
- organizing the instructions into at least one function that each comprise a code block;
- constructing a control flow graph characterizing the at least one function;
- extracting application programming interface (API) call sequences by traversing the control flow graph; and
- determining a relative order of API calls.

15. A system comprising:
at least one hardware data processor; and
memory storing instructions which, when executed by the at least one hardware data processor, result in operations comprising:
- receiving data comprising at least a portion of a program;
- first identifying and retrieving entry point locations and execution-relevant metadata of the at least a portion of the program;
- second identifying regions of code within the at least a portion of the program based on the identified entry point locations and the metadata;
- first generating, based on the first identifying and the second identifying, a set of possible call sequences for at least one function;

second generating an API call graph characterizing the generated set of possible call sequences for the at least one function;
- disassembling the at least a portion of the program inio instructions;
- organizing the instructions into at least one function that each comprise a code block;
- constructing a control flow graph characterizing the at least one function;
- extracting application programming interface (API) call sequences by traversing the control flow graph; and
- determining a relative order of API calls.

* * * * *